United States Patent [19]

Ueda et al.

[11] Patent Number: 4,752,124

[45] Date of Patent: Jun. 21, 1988

[54] MICRO-FILM READER

[75] Inventors: Nobuo Ueda; Osami Katoh, both of Sagamihara; Takanori Saito, Kawasaki, all of Japan

[73] Assignee: Minolta Camera Kabushiki Kaisha, Osaka, Japan

[21] Appl. No.: 884,007

[22] Filed: Jul. 10, 1986

[30] Foreign Application Priority Data

Jul. 12, 1985 [JP] Japan .................................. 60-154546
Jul. 12, 1985 [JP] Japan .................................. 60-154547
Jul. 15, 1985 [JP] Japan .................................. 60-156540

[51] Int. Cl.[4] .......................................... G03B 23/12
[52] U.S. Cl. .............................................. 353/26 R
[58] Field of Search .................. 353/25, 26 R, 26 A, 353/27 R, 27 A

[56] References Cited

U.S. PATENT DOCUMENTS 3,741,637 6/1973 Katsuragi .
3,751,152 8/1973 Rinehart ........................ 353/26 A
4,043,652 8/1977 Mickelson .................... 353/26 A
4,436,391 3/1984 Kashiwagi .................... 353/26 R

FOREIGN PATENT DOCUMENTS 2220547 4/1980 Fed. Rep. of Germany .... 353/26 R

Primary Examiner—Harry N. Haroian
Attorney, Agent, or Firm—Burns, Doane, Swecker & Mathis

[57] ABSTRACT

A micro film reader for projecting by optical devices on a projection surface a selected image recorded in a micro film having a plurality of recording channels in a direction of width of the micro film. The micro film reader has a film carrier for holding and transporting the micro film, a drive motor for shifting the film carrier in the width direction of the micro film, shifting amount setting keys for setting shifting amount of the film carrier, and a channel switching device. The channel switching device controls the drive motor to shift the film carrier by a shifting amount set by means of the shifting amount setting keys. The micro film reader further has a film shifting device for controlling the drive motor to shift the film carrier by a certain amount in response to external signals.

10 Claims, 13 Drawing Sheets

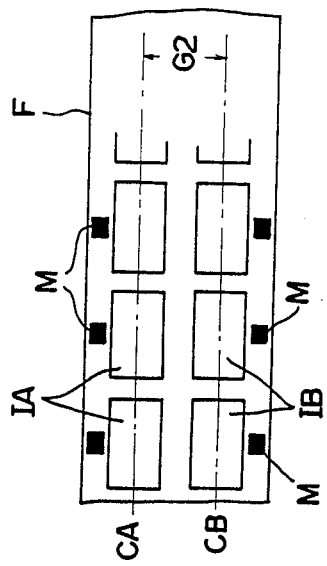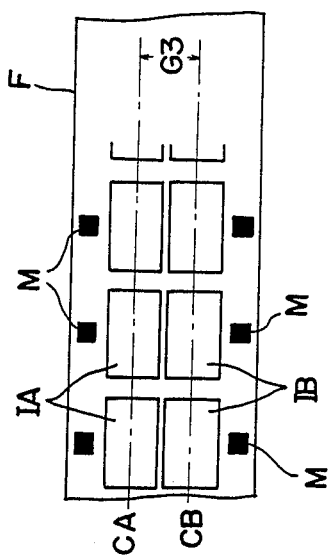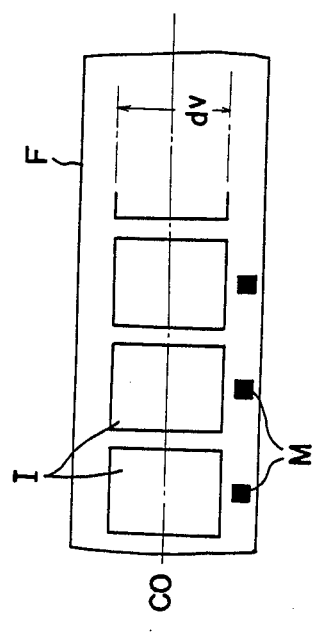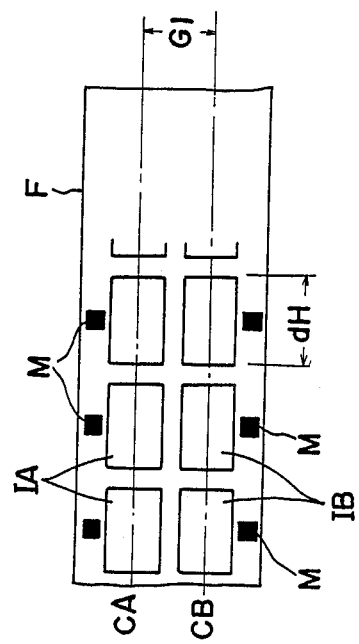

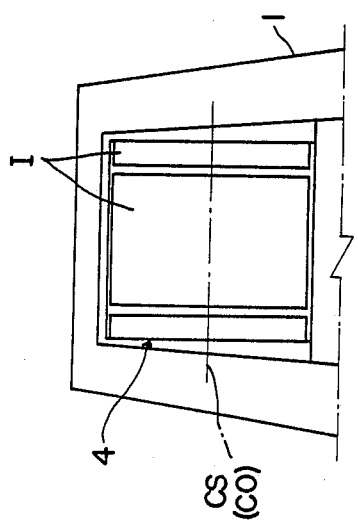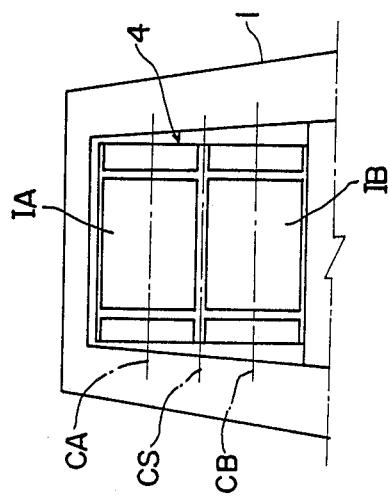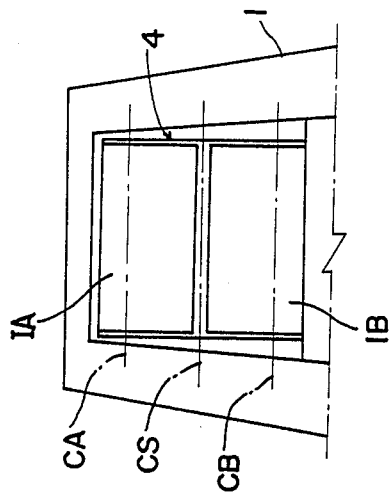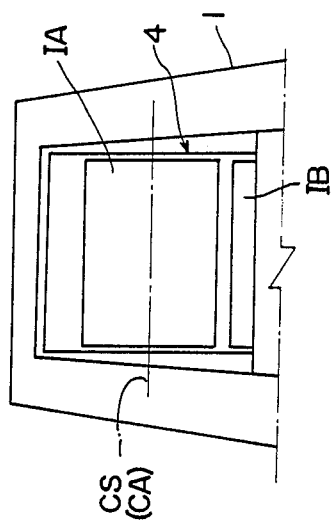

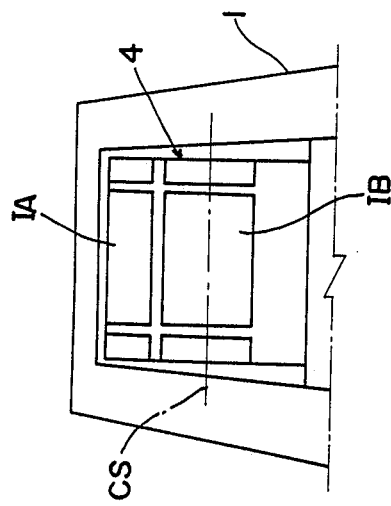
Fig. 6-g
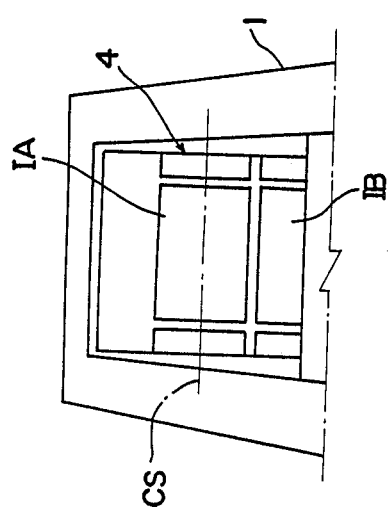
Fig. 6-e
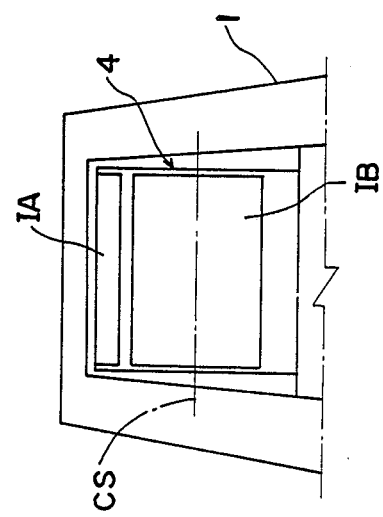
Fig. 6-f

MICRO-FILM READER

BACKGROUND OF THE INVENTION

1. Field of the Invention

The present invention relates to a micro film reader for projecting on a viewing screen a micro image in a micro film capable of recording various kinds of information in high density, and more particularly to the micro film reader including a film carrier for holding the micro film having micro images printed in two channels provided in the width direction of the film and a carrier shifting device for shifting the film carrier in the width direction of the micro film.

2. Description of the Prior Art

A known carrier shifting device included in the above-described micro film reader comprises a manual control apparatus such as a knob and a handle and the like and a linking mechanism for operatively connecting the manual control apparatus and the film carrier. In switching the channels, an operator has to change relative positions of the film and the viewing screen by controlling the manual control apparatus to shift the film carrier in the width direction of the film with the operator watching the micro image projected on the viewing screen.

However, according to this system, the operator has to manually operate the manual control means to shift the film carrier when projecting on the viewing screen the desired micro image recorded in a different channel from the channel of the presently projected micro image. Moreover, the operation of the manual control means must be carried out carefully in order to completely project the desired micro image on the viewing screen by adjusting the relative positions of the film and the screen. Thus, the projecting operation of the micro image is not carried out efficiently.

U.S. Pat. No. 4,436,391 discloses another arrangement comprising a drive apparatus for the carrier shifting device and channel switching means for actuating the drive apparatus to automatically permit the entire micro image in the width direction of the micro film recorded in a channel different from the currently projected channel to be shifted into a desired position on the viewing screen, whereby the channel switching operation may be carried out more readily.

However, the micro film reader employing this arrangement has a problem to be described hereinafter.

Distance between the micro images 'IA' and 'IB' respectively recorded in the two channels, as illustrated in FIG. 4-b or FIG. 4-d, is not always the same depending on a make of the employed film 'F'. Also, the micro images 'IA' and 'IB' are not always printed linear-symmetrically relative to the width direction of the film 'F'. This is because different manufacturers employ different standards in printing the micro images 'IA' and 'IB'.

As a result, the micro image of either of the channels may be entirely projected on the screen in the case of a certain make of the micro film. However, when the micro film of a different make is employed, the micro image(s) of either of or both of the channels may fail to be completely projected.

In order to permit the entire micro images of both of the channels to be projected on the viewing screen in the above-mentioned case, the film carrier must be shifted mannually or a fine adjustment on the printed board must be made each time the film recorded by a different image-printing standard is used.

SUMMARY OF THE INVENTION

It is the main object of the present invention to avoid the troubles occurring at shifting of the film carrier when the channels are switched and the desired portion of the micro image is enlargedly projected in the case of using the micro film having the micro images printed in the two channels in its width direction.

It is another object of the present invention to provide a system in which the channel switching operation is readily carried out for various micro films manufactured under different standards.

BRIEF DESCRIPTIONS OF THE DRAWINGS

The accompanying drawings illustrate a micro film reader according to the present invention in which.

Figure 5:
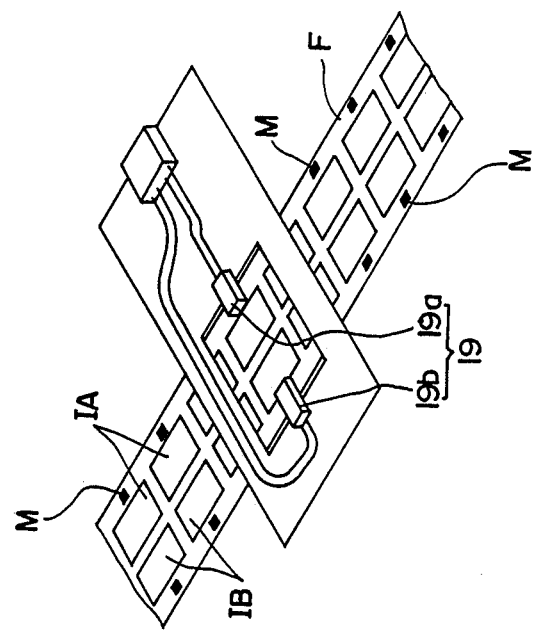
Figure 7:
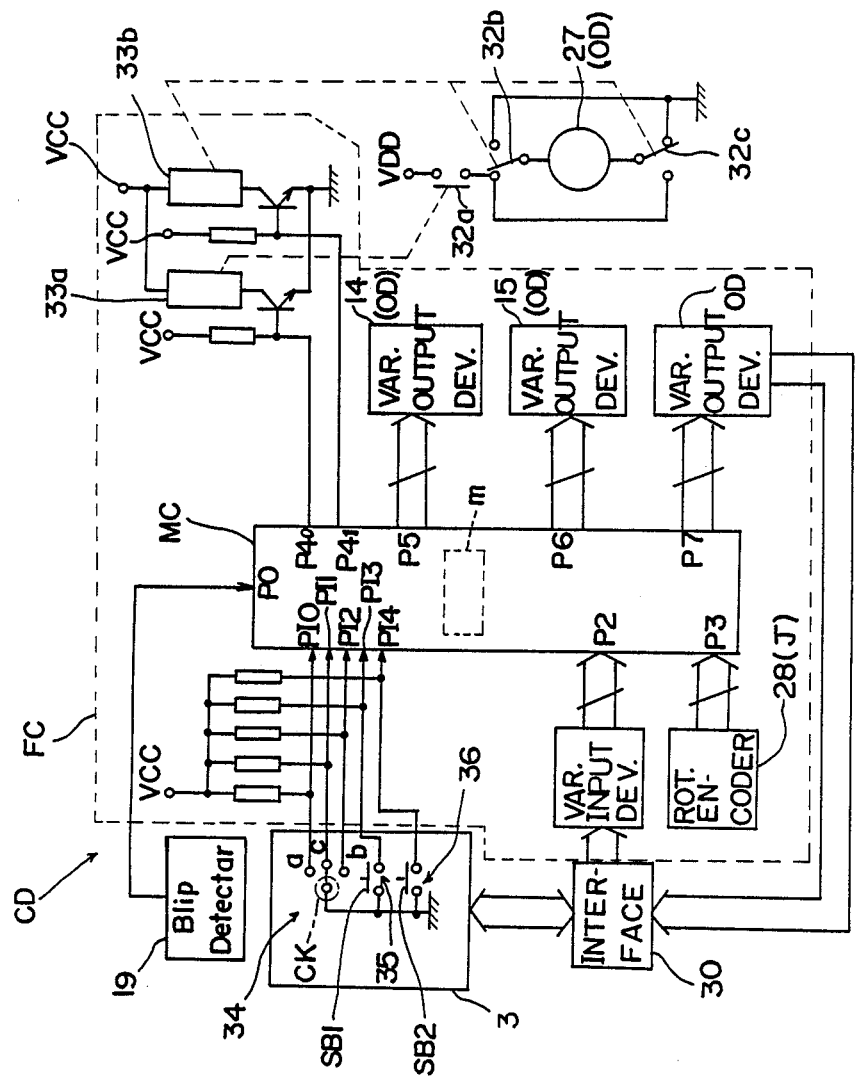
Figure 8:
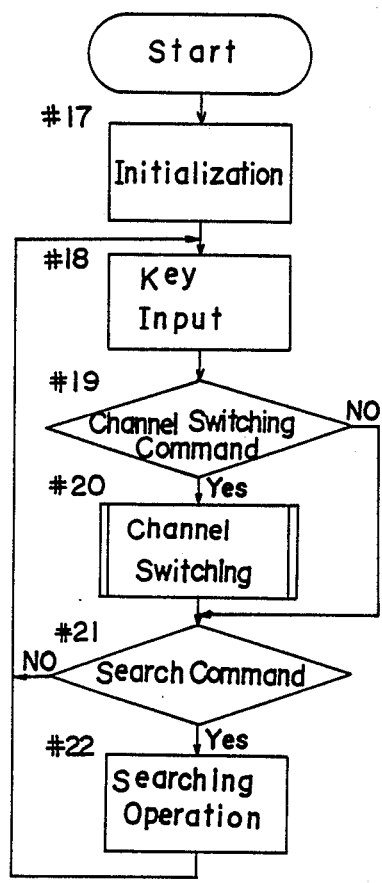
Figure 10:
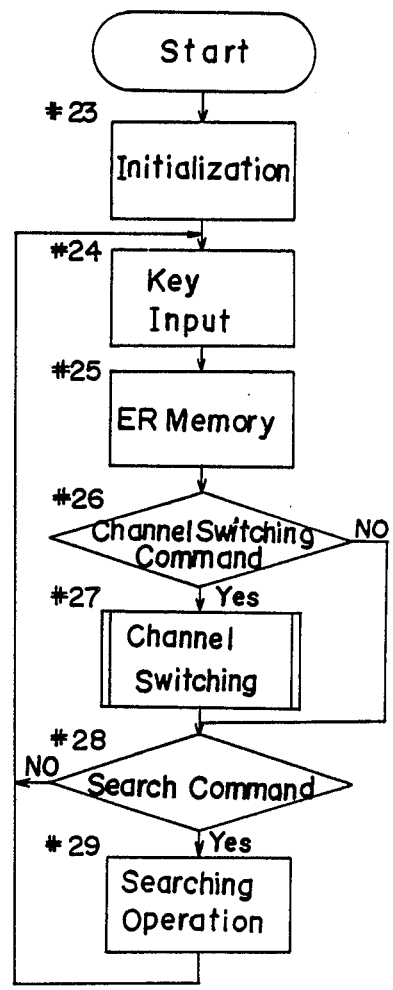
Figure 9:
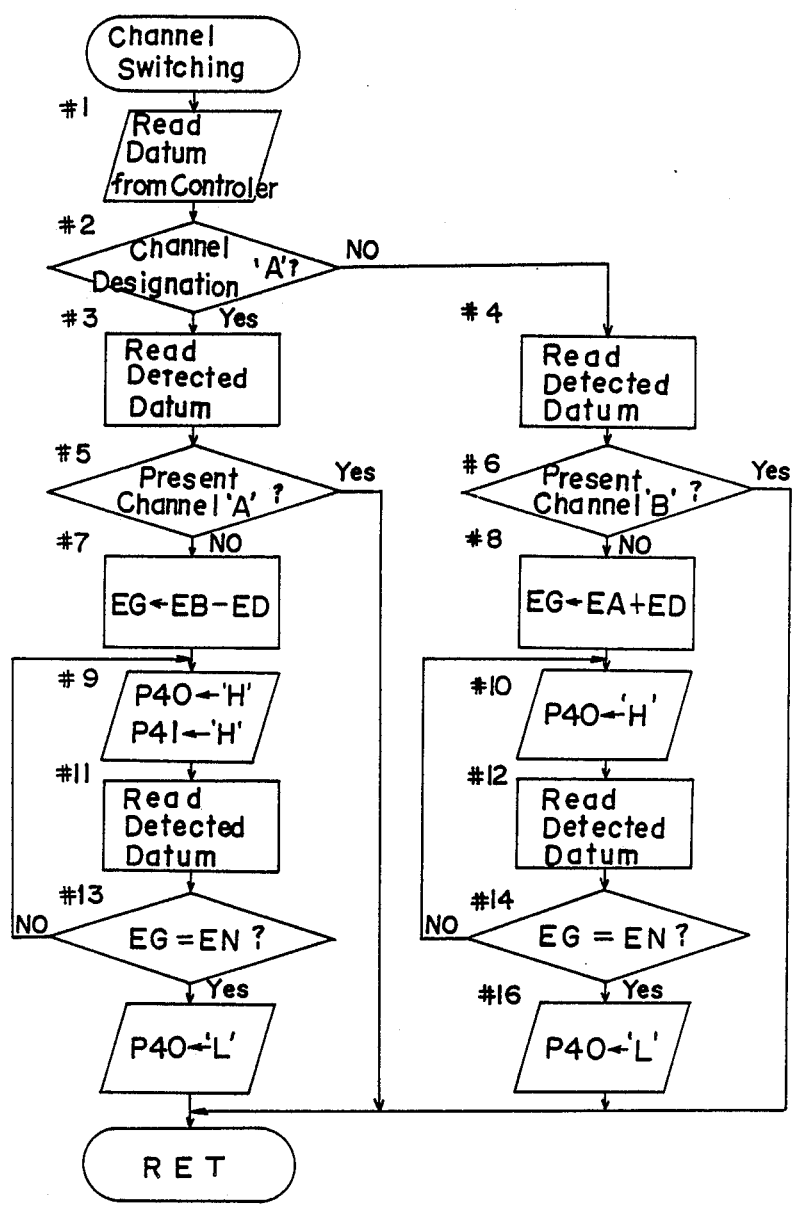
Figure 11A:
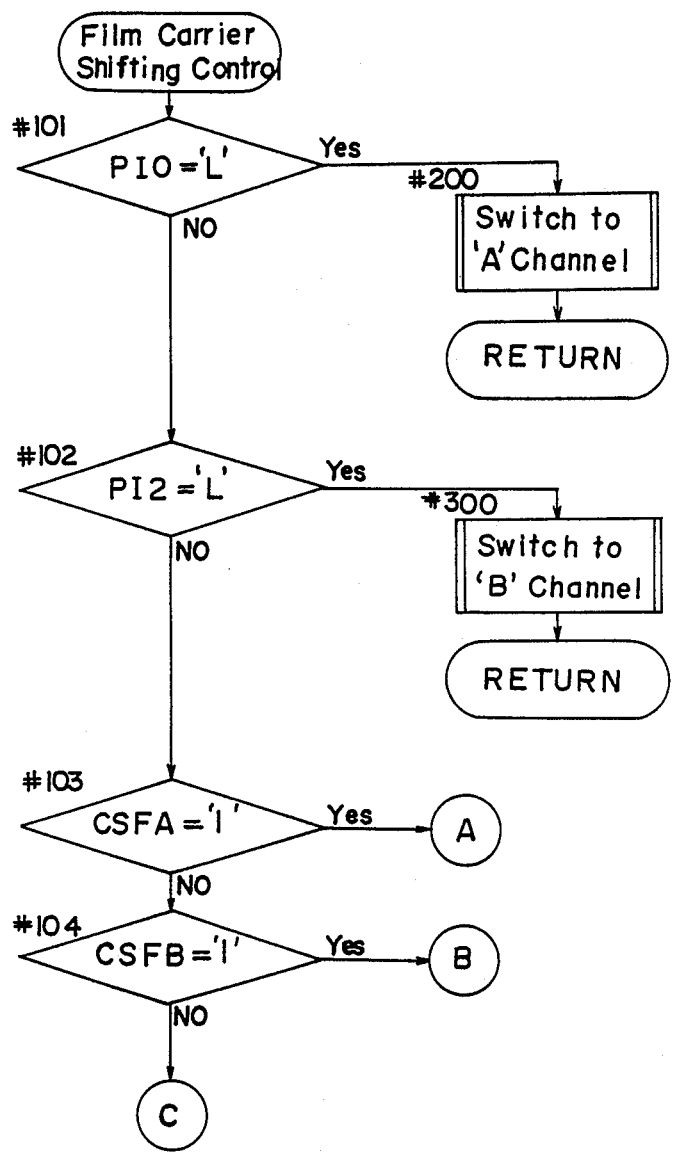
Figure 11B:
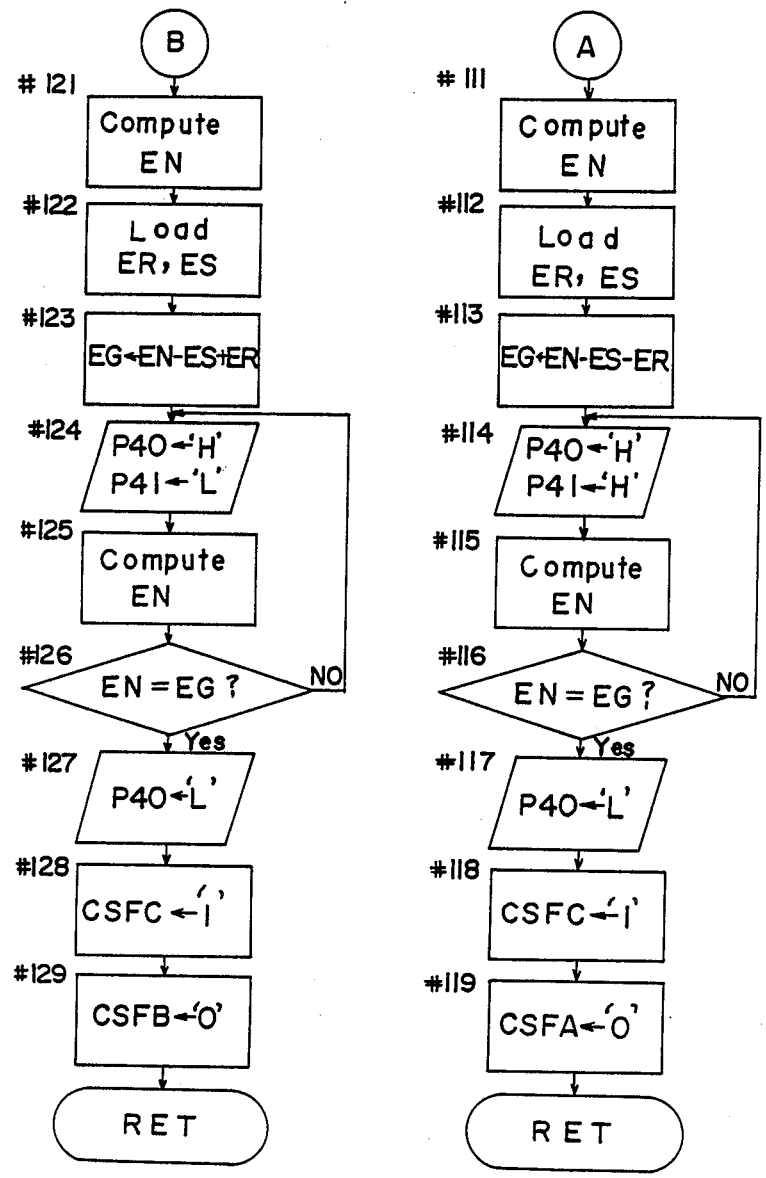
Figure 11C:
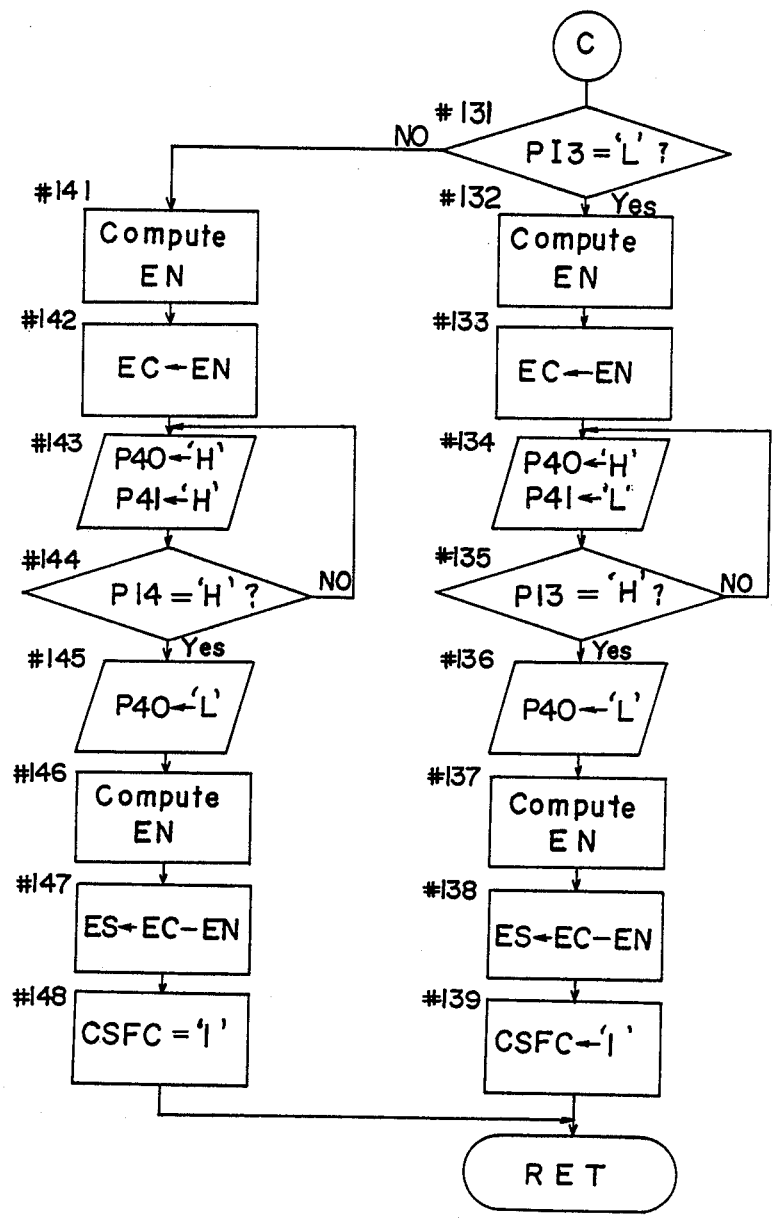
Figure 12:
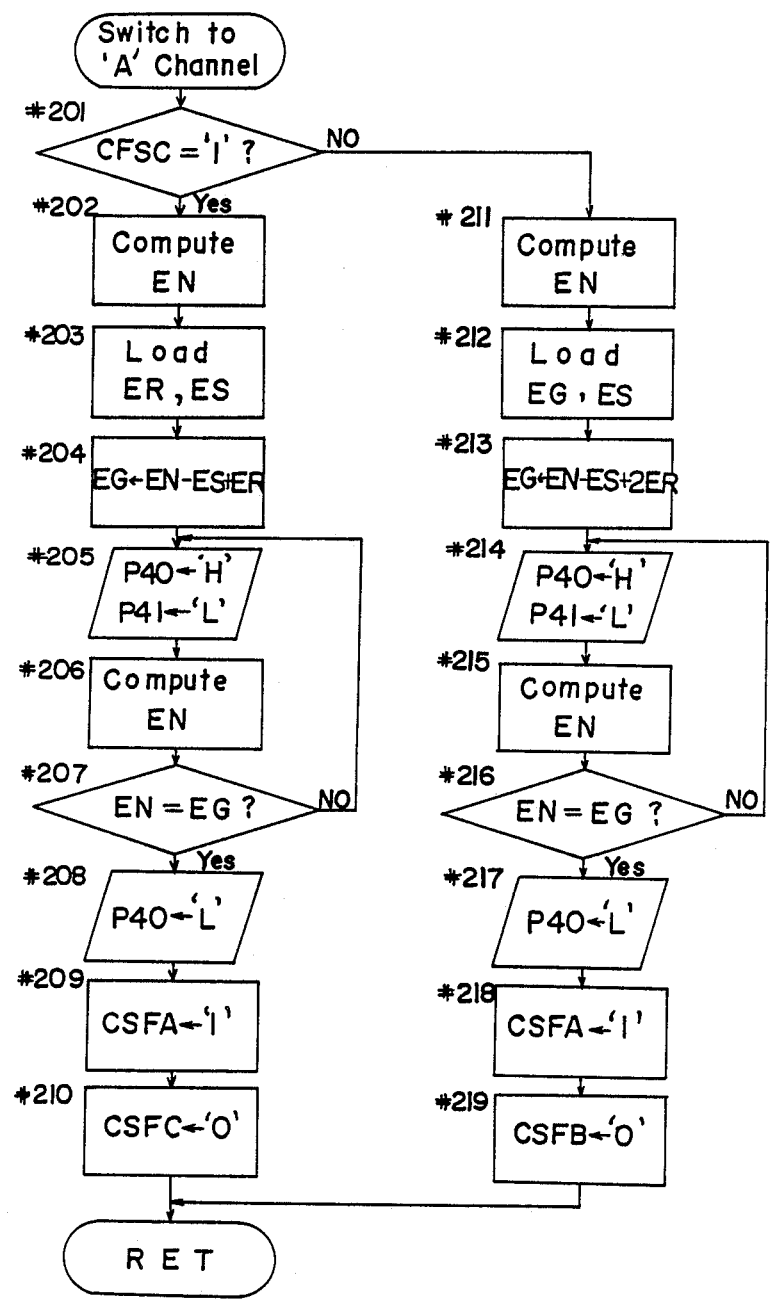

FIGS. 4-a, 4-b, 4-c, 4-d are plan views of four types of micro films;

FIG. 5 is a perspective view showing relative positions between a blip detector and the micro film;

FIGS. 6-a through 6-g are plan view showing positions of a micro image on a viewing screen;

FIG. 7 is a block diagram of a control system of the micro film reader-printer according to another embodiment;

FIG. 8 is a flow chart describing the main routine of the control system of the micro film reader-printer;

FIG. 9 is a flow chart of channel switching operation;

FIG. 10 is a flow chart describing the main routine of the control system of the micro film reader-printer with reference to FIG. 9;

FIGS. 11-a, 11-b, 11-c are a flow chart describing a film carrier shifting control routine;

FIG. 12 is a flow chart describing an 'A' channel switching routine.

DETAILED DESCRIPTION OF THE PREFERRED EMBODIMENT

Figure 2:
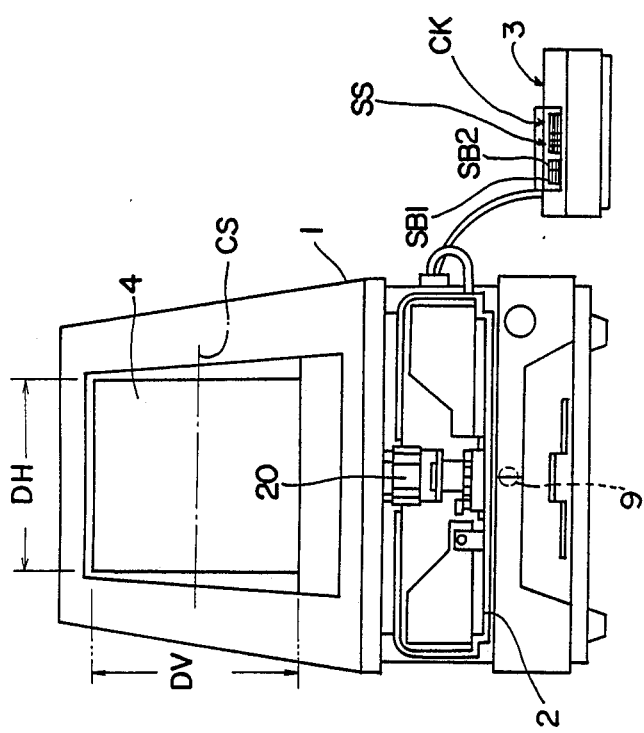
FIG. 2 is a front view of the micro film reader-printer.

Referring to FIGS. 2 and 5, a micro film reader-printer includes a body of reader-printer 1, a film carrier 2 and a contoroller 3.

The micro film reader-printer selectively provides a reading mode where a magnified image of a micro image 'I' on a micro film 'F' supported by the film carrier 2 is projected on a viewing screen 4 and a printing mode where the magnified image is printed on a recording material by means of an electronic photographic process.

Figure 3:
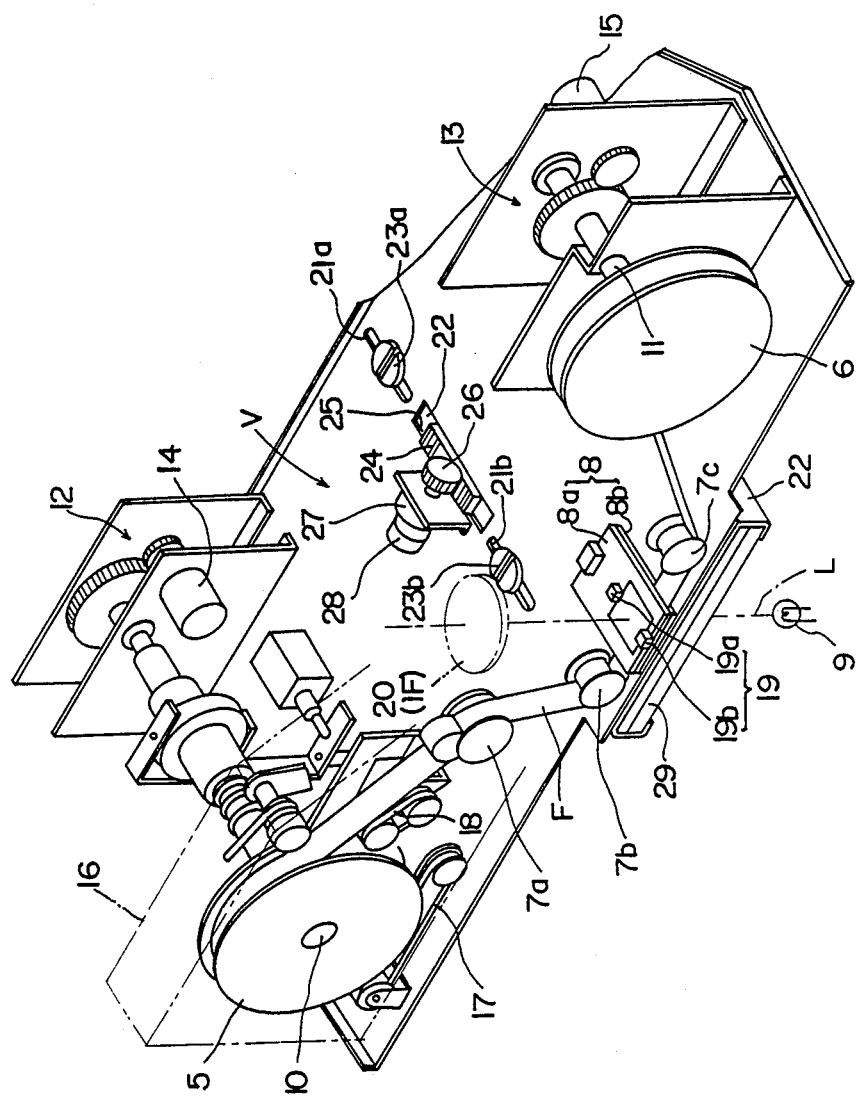
FIG. 3 is a perspective view illustrating an inside of a film carrier.

Inside the film carrier 2 are provided a feeding reel 5 and a winding reel 6 as illustrated in FIG. 3. The micro film 'F' stretched tight across the reels 5, 6 is guided by a plurality of guiding rollers 7a through 7c and bound tightly between a pair of glass plates constituting a projecting section 8. This projecting section 8 is so arranged to position the film carrier 2, when set to the body of reader-printer 1, co-centrally with a center of beam from a light source 9. Rotary shafts 10, 11 provided for the reels 5, 6 are connected through drive mechanisms 12, 13 to respective motors 14, 15. By driving one of the motors 14, 15, the micro film 'F' is transported in a normal or reverse direction.

The winding reel 6 is supported by the film carrier 2, whereas the feeding reel 5 is housed in a cartridge 16 which is freely attachable and detachable relative to the film carrier 2. The rotary shaft 10 for the feeding reel 5 is adapted to automatically engage the feeding reel 5 with an attachment of the cartridge 16 to the film carrier 2.

At the attachment of the cartridge 16, the rotary shaft 10 automatically engages the feeding reel 5 and the rotary shaft 10 momentarily rotates the feeding reel 5 counterclockwise to prevent a looseness of the micro film 'F'. Then, a transporting belt 17 operatively connected to a motor (not shown) is engaged with a surface of the film to rotate the micro film 'F' as well as the feeding reel 5 clockwise, as shown, to pick up a leading edge of the film 'F' by means of a releasing belt 18 attached to the surface of the film, and to transport the film through the projecting section 8 to engage the winding reel 6. In this condition, the pair of glass plates 8a, 8b included in the projecting section 8 are released from their tight contact.

Then, the transporting belt 17 and the releasing belt 18 are detached from the surface of the film and the glass plates 8a, 8b constituting the projecting section 8 are again placed in mutual contact with each other. Then, the micro film 'F' is transported by means of the two motors 14, 15.

The longitudinal transportation of the micro film 'F' is controlled by counting blips of the film to be described later through the motors 14, 15 and a control system CD therefor and the like ,with reference to FIG. 1, so that the micro film 'F' is stopped at a predetermined position. If either of the aforementioned modes is selected in this condition, the magnified image of the micro film 'F' positioned in the projecting section 8 is projected on the viewing screen 4 or printed on the recording material.

It is to be noted here that this micro film reader printer employing the film carrier 2 is capable of handling two types of the micro film 'F'. Thus, these two types of micro films 'F' and a construction of the reader printer needed for handling the films will be described hereinafter.

Referring to FIG. 4-a, a first type of micro film has a single image relative to its width direction. For each of the micro image 'I' is printed a blip 'M', a marking adapted for frame searching. This type of micro film 'F' will be referred to as mono-type micro film hereinafter.

Referring to FIG. 4-b, a second type of micro film has a pair of micro images IA, IB relative to its width direction. This type of micro film 'F' will be referred to as duo-type micro film hereinafter. As for this duo-type , columns of the pair of micro images IA, IB printed in tandem longitudinally of the micro film 'F' are referred to as channels. For each of the micro images IA, IB in each channel is printed the blip 'M'.

As shown in FIG. 3, the projecting section 8 of the film carrier 2 includes a blip detector 19 having a pair of light receiving elements 19a, 19b and the like. These light receiving elements 19a, 19b are adapted for detecting the blip 'M' by the state of a change in intensity of the light sensed when the light from the light source 9 is prevented by the blip 'M' having lower transparency than a base of the film 'F'. Each time the blip detector 19 detects the blip 'M' as the micro film 'F' is transported, the value of a counter, not shown, increases one by one to indicate a frame number of the micro image, 'I', IA or IB in the position.

The light receiving elements 19a, 19b are respectively disposed as opposed to the two blips of the duo-type micro film 'F'. Therefore, in case of the duo-type micro film 'F', the two light receiving elements are capable of detecting the blips 'M' of the two channels, while in case of the mono-type micro film 'F', one of the light receiving element 19b alone is capable of detecting the blip 'M'.

In general, in the respect of the duo-type micro film 'F', the printed image is transported from its leading edge of 'A' channel to its ending edge and then switched to be reversely transported from its ending edge of 'B' channel to its leading edge. And each of the micro images IA, IB is numbered in the above-described order to have a serial number.

The micro image searching operation is carried out as follows. A frame number corresponding to a sought micro image is input to the controller 3. The blip 'M' corresponding to each of the micro images IA, IB is counted in order and the film 'F' is transported until the counted value agrees to the input frame number.

The longitudinal transportation of the duo-type micro film 'F' is carried out in a same manner as its printing operation. The number of the blip 'M' of each micro image IA increases one by one based on a signal from the light receiving element 19a for the 'A' channel. When the sought micro image is not found, the film 'F' is transported reversely and the counting-up operation is continued based on a signal from the light receiving element 19b for the 'B' channel.

Thus, when the image searching operation is completed, the controller 3 obtains information concerning whether the micro image is in the 'A' channel or in the 'B' channel. The controller 3 outputs this information as channel designating information to a film transportation control section FC as an example of film shifting means to be described later.

More particularly, the controller 3 outputs the channel designating information for the 'A' channel when the sought micro image is found in the 'A' channel and outputs the channel designating information for the 'B' channel when the image is found in the 'B' channel, respectively. The film transportation control section FC, as will be particularly described later, controls shifting of the film carrier 2 in the width direction of the film 'F' by receiving the channel designating information.

The above-described image searching operation may be carried out in another way to be described hereinafter. The total number of the frames of the all micro images IA, IB printed on the film 'F' is input in advance. When a certain frame number input for image searching is in the vicinity of the total number, the total number is decreased one by one with each detection of the blip 'M' as the film 'F' is transported forwardly.

According to this method too, since the controller 3 receives the information concerning whether the sought micro image 'I' is in the 'A' channel or in the 'B' channel, this information may be utilized as the channel designating information.

As illustrated in FIG. 3, when the film carrier 2 is attached to the body of reader-printer 1, the light from the light source 9 permeates the micro image 'I', IA, IB in the projecting section 8 of the film carrier 2. In case of the reading mode, the permeated light is magnified to be projected on the viewing screen 4 through an optical assembly IF including a projecting lens 20 and a plurality of mirrors, not shown.

The magnifying ratio through the optical assembly IF is generally predetermined such that a width of the micro image 'I' of the mono-type film, referred to as dV in FIG. 4-a, conforms substantially to a vertical size of the viewing screen 4, referred to as DV in FIG. 2. With this arrangement, the micro image 'I' of the mono-type film has its center line longitudinal of the film, referred to as Co in FIG. 4-a, conforming to a vertical center line of the viewing screen 4, referred to as Cs in FIG. 2 and is projected as shown in FIG. 6-a. If the duo-type micro film 'F' is employed in this condition, the pair of micro images IA, IB printed in tandem relative to the width of the film 'F' are projected in tandem vertically of the viewing screen 4.

The magnifying ratio through the optical assembly IF may be changed by exchanging the projecting lens 20 so that the longitudinal size of the micro image IA or IB of the duo-type film, shown as dH in FIG. 4B substantially agrees to a lateral size, shown as DH in FIG. 2, of the viewing screen 4. However, without any further arrangement, there occurs an image loss in both of the micro images IA, IB of the two channels.

Thus, in order to cope with the duo-type micro film 'F', the relative position between the film 'F' and the screen 4 is adapted to be changeable by shifting the entire film carrier 2 in the direction of the width of the film 'F'. This arrangement, as illustrated in FIG. 6-d, or 6-f, permits an entire image of the micro image IA or IB of one of the channels to be projected on the viewing screen 4 when the duo-type micro film is in use.

A structure needed for the abovementioned arrangement will be particularly described next starting with a carrier shifting device 'V' for shifting the film carrier 2 in the width direction of the film.

As illustrated in FIG. 3, the film carrier 2 defines two elongate openings 21a, 21b in the width direction of the film 'F' and guide pins 23a, 23b are inserted into the elongate openings 21a, 21b to be fixed to a shifting plate 22, thereby the film carrier 2 and the shifting plate 22 are relatively movable in the width direction of the film 'F'. A rack 24 fixed on the shifting plate 22 is disposed so as to extend through another elongate opening 25 formed in the film carrier 2. A pinion gear 26 engaging the rack 24 and a motor 27 fixed to the film carrier 2 are operatively connected with each other.

By normal and reverse rotations of this motor 27 as one example of driving apparatus, the film carrier 2 is shifted in the width direction of the film 'F' relative to the shifting plate 22. The motor 27 includes a rotary encoder 28 for converting a rotational speed of the motor 27 into an electrical signal and outputting the signal. The output signal from the rotary encoder 28 is input to a microcomputer MC constituting the control system CD to be described later to detect the relative position between the film carrier 2 and the shifting plate 22.

When the duo-type micro film 'F' is used, based on the channel designating information from the controller 3 shown in FIG. 2, the film carrier 2 is shifted so that the entire micro image IA or IB in the designated channel is projected on the viewing screen 4. More specifically, the driving control for the motor 27 is executed to shift the film carrier 2 in such a way that the micro image IA or IB of the designated channel has its center line longitudinal of the film, shown as CA or CB in FIG. 4-b, conforming to the vertical center line of the viewing screen 4, shown as CS in FIG. 2. As a result, the micro image IA or IB is projected on the screen 4, for example, as shown in FIG. 6-d.

The motor driving control system will be more particularly described hereinafter. As described above, the present position of the film carrier 2, i.e. the present channel is detected by means of the aforementioned detected information sent from the rotary encoder 28. When the sought micro image is found whereby the controller 3 outputs the channel designating information, it is judged whether the newly designated channel is the same as the present channel. If not, the motor 27 is driven by a predetermined amount corresponding to the distance between the channels in the designated direction to shift the film carrier 2 in the direction of the width of the film 'F'. Whether the film carrier 2 has been shifted by the predetermined amount or not is judged by comparing the direction information from the rotary encoder 28 and a drive control signal applied to the motor 27. When the newly designated channel is detected to be the same as the present channel, the film carrier 2 is not shifted.

With this arrangement, in the reading mode for the duo-type micro film 'F', the micro image IA or IB of the frame designated by the controller 3 through the frame number may be projected on the vicinity of the center of the viewing screen 4 without any extra troubles.

The shifting plate 22 is outwardly mounted on the turn table 29 attached to the body of reader-printer 1 to be fixedly slided therein. By releasing this fixation, the film carrier 2 along the shifting plate 22 is detached so that a fiche carrier, not shown, for holding a micro fiche and the like may be attached in place of the film carrier 2 for holding a roll film.

The turn table 29 is mounted on the body of reader-printer 1 to be freely rotatable about the center 'L' of the beam sent from the light source 9. Since the upward and downward directions of the printed image do not necessarily agree to the upward and downward or the directions of the micro image 'I', IA or IB, the film carrier 2 or a fiche carrier and the like is adapted to be rotatable by 90 degrees about the center 'L' of the beam so that the upward and downward directions of the printed image always agree to the upward and downward directions of the viewing screen 4.

The control system CD for controlling the operations of the micro film reader-printer as structured above will be described next.

Figure 1:
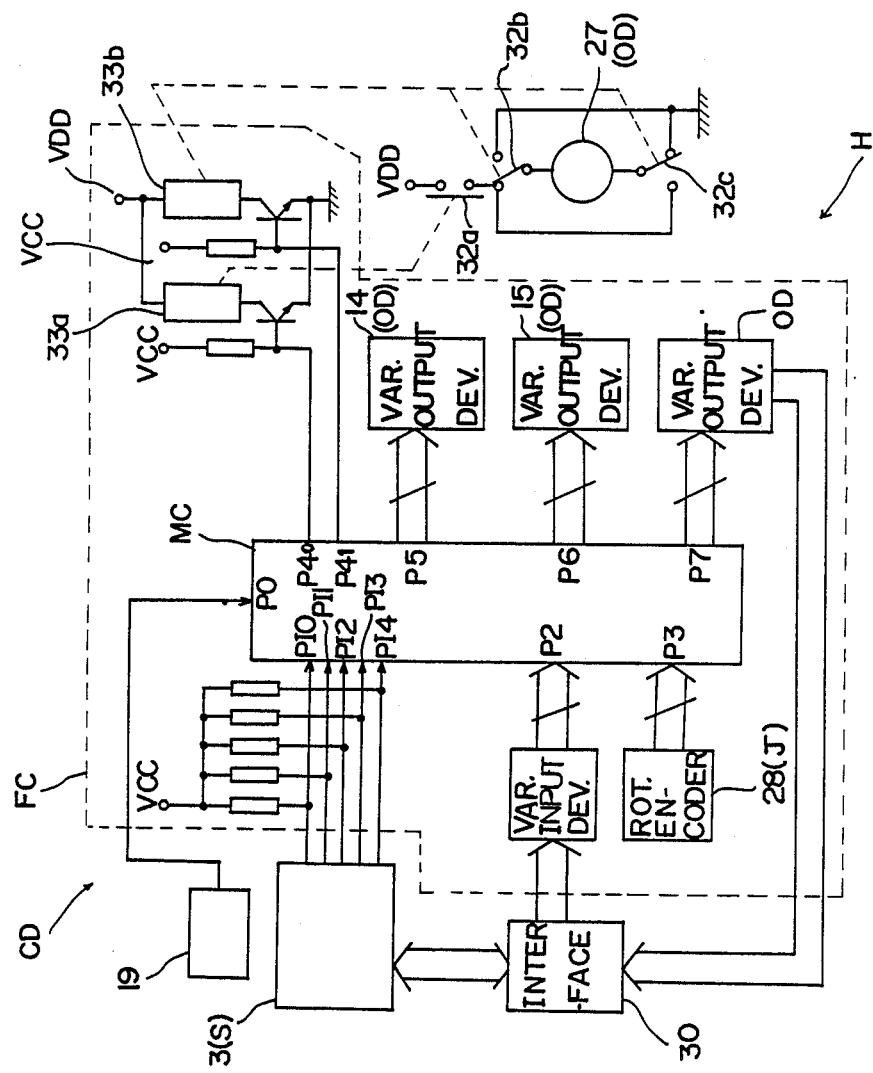
FIG. 1 is a block diagram showing a control system of the micro film reader-printer.

Referring to FIG. 1, this control system CD includes the film transportation control section FC mounted on the film carrier 2 and adapted for transporting the micro film 'F' in its longitudinal direction and for shifting the film 'F' in its width direction, the controller 3 for determining various kinds of operational parameters and an interface 30.

The film transportation control section FC, as an example of film shifting control means, has its main part constituted of the micro computer MC. The output signals from the micro computer MC are input to various kinds of output devices OD such as the aforementioned motors 14, 15 for transporting the micro film 'F' longitudinally in the normal and reverse directions. One of the output devices OD is a motor 27 for driving a carrier shifting device 'V'.

This motor 27 becomes operative and non-operative by switching-on and switching-off of a first relay terminal 32a respectively and reverses its rotation by a switching operation between second and third relay terminals 32b, 32c. The first relay terminal 32a is operatively connected to a first relay 33a which is turned 'ON' or 'OFF' in accordance with an output signal from an output port P4o of the microcomputer MC. The second and third relay terminals 32b, 32c are operatively connected to a second relay 33b which is turned 'ON' or 'OFF' in accordance with an output signal from an output port P41 of the microcomputer MC.

Input ports PI0 through PI4 of the microcomputer MC are connected to the controller 3. A parameter set by operating each key of the controller 3 is input to the microcomputer MC. Another input port P3 of the microcomputer MC is connected to the aforementioned rotary encoder 28 such that the microcomputer MC may obtain information about a present position of the film carrier 2 based on an input signal from the rotary encoder 28.

A reference number 19 is the blip detector consisting of the pair of light receiving elements 19a, 19b. The controller 3 outputs the channel designating information for designating A or B channel and other information to the microcomputer MC.

The microcomputer MC compares this channel designating information with the present channel position information obtained from the rotary encoder 28. When the two kinds of information are determined to be different from each other, the output signal from the output port P40 is made 'H' to switch 'ON' the first relay 33a and then to actuate the motor 27. In the abovementioned process, an output signal from the output port P41 is in 'H' or 'L' state depending on a direction of the film carrier 2 to be shifted, thereby the motor 27 is driven in a designated rotational direction.

The microcomputer MC, by means of the information obtained from the rotary encoder 28, computes a coordinate datum, which corresponds to the present position of the film carrier 2, on a coordinate axis extending in the width direction of the film 'F'. When the datum agrees to a coordinate datum corresponding to a designated channel, the microcomputer MC switches the output signal from the output port P40 into 'L' level to terminate the shifting of the film carrier 2.

The microcomputer MC further carries out a counting-up operation of a counter, not shown, in accordance with a detection of the blip 'M' made by the blip detector 19 so that the drive control operations of the two motors 14, 15 for transporting the micro film 'F' are executed based on a comparison with the frame number information obtained from the controller 3.

Among the above-described micro image searching operations by the control system CD, the operation of shifting the film carrier 2 with the duo-type micro film 'F' employed will be more particularly described hereinafter with reference to a flow chart illustrated in FIGS. 9 and 8.

After initialization at step #17, a parameter set by a key operation of the controller is input at step #18. If a channel designating command is input at step #19, a channel switching routine is executed at step #20. If not, the process jumps to step #21. If a searching command is input at step #21, the searching operation is executed by driving the motors 14, 15 at step #22. If not, the above-described process is repeated. This searching operation is well-known, therefore will not be particularly described here.

The channel switching routine will be particularly described next. The datum from the controller 3 is read at step #1 and it is judged whether the designated channel is the 'A' channel or the 'B' channel at step #2. In either case, the datum from the rotary encoder 28 is read at step #3 or at step #4. At step #5, when the 'A' channel is designated, it is judged whether the present channel is the 'A' channel or not, or at step #6, when the 'B' channel is designated, it is judged whether the present channel is the 'B' channel or not.

If the present channel is judged to be the same as the designated channel, the process returns to the main routine without carrying out the channel switching operation. If the channels are judged to be different from each other, an object value EG of the datum to be detected by the rotary encoder 28 is computed at step #7 or at step #8.

When the 'B' channel is switched to the 'A' channel, the object value EG is obtained by subtracting a shifting datum ED corresponding to a distance, referred to as G1 in FIG. 4-b, between center lines of the two channels longitudinal of the film 'F' from the datum EB denoting the present position of the 'B' channel at step #7. When the 'A' channel is switched to the 'B' channel, the object value EG is obtained by adding the shifting datum ED to a datum EA denoting the present position of the 'A' channel at step #8.

In other words, by referring the position denoting the 'A' channel or the 'B' channel to the coordinate system extending in the width direction of the film 'F', a relative position between the viewing screen 4 and the film 'F' is represented as the coordinate datum in the coordinate system.

When the 'B' channel is switched to the 'A' channel, the output ports P40 and P41 are made 'H' to drive the motor 27 for the carrier shifting device 'V' in reverse rotation at step #9, the detected datum EN by the rotary encoder 28 is read at step #11 and it is judged whether this datum EN has reached the object value EG or not at step #13. If not, the process returns to step #9 to continue the reverse rotation of the motor. If the datum EN is judged to have reached the object value EG, the output port P40 is switched to 'L' to stop the motor 27 at step #15 and then the process returns to the main routine.

On the other hand, when the channel is switched from the 'A' to the 'B', the output port P40 alone is switched to 'H' to drive the motor 27 in normal rotation at step #10, the datum EN detected by the rotary encoder 28 is read at step #12 and it is judged at step #14 whether this datum EN has reached the object value EG or not. If not, the process returns to step #10 to continue the normal rotation of the motor 27. When the datum EN is judged to have reached the object value EG, the output port P40 is switched to 'L' to stop the motor 27 at step #16 and then the process returns to the main routine.

A second embodiment of the micro film reader according to the present invention will be described hereinafter.

In this embodiment, the micro film reader is so structured that the predetermined driving amount of the motor corresponding to the distance between the two channels may be variably set.

The distance between the micro images IA and IB in the two channels of the duo-type micro film 'F', as shown in FIG. 4-b, 4-c and 4-d, is not always the same because manufactures employ different standards in printing the micro images IA and IB. Thus, by permitting the driving amount of the motor 27 to be variably set in accordance with distances, referred to as G1, G2, G3 in FIG. 4-b, 4-c and 4-d, between the two channels of a film 'F' in use, the desired micro image IA or IB is entirely, i.e. without any image loss, projected on the viewing screen 4 even when a different type of film 'F' is used.

More specifically, the driving amount of the motor 27 is adapted to be freely settable by means of number setting keys SS shown in FIG. 2.

Further, a channel switching knob CK, as a channel switching means, is provided to the controller 3 in this embodiment. By controlling this channel switching knob CK, the motor 27 is so controlled as to shift the film carrier 2 to enable the micro image 'I' in the other channel to be entirely projected on the viewing screen 4. Additionally, by operating film shifting buttons SB1, SB2 as one example of film shifting means, the film carrier 2 is shiftable by a desired distance in the width direction of the film 'F'. The drive control system of the motor 27 during the channel switching operations will be more particularly described next. With a switching operation of the channel switching knob CK, the motor 27 is driven in normal or reverse rotation by a certain amount determined by the distance between the channels to shift the film carrier 2 in the width direction of the film 'F'.

The control system CD for controlling the micro film reader-printer having the above-described structure will be more particularly described hereinafter with reference to FIG. 7.

This control system CD, as shown in FIG. 7, includes the film transportation control section FC for controlling the transportation of the micro film 'F' and the shifting of the film 'F' in its width direction, the controller 3 for setting the various parameters and an interface 30 and the like.

The film transportation control section FC and the interface 30 and the like are the same as those in the first embodiment, therefore, will not be described here.

A rotary switch 34 operatively connected to the channel switching knob CK and a pair of switches 35, 36 operatively connected to the film shifting buttons SB1, SB2 are connected to the input ports PI0 through PI4 of the microcomputer MC.

The input ports PI0 through PI2 are switched to 'L' when their respective terminals (a) through (c) become conductive with the rotary switch 34 and the input ports PI3 and PI4 are switched to 'L' with closings of the switches 35, 36, respectively.

The two film shifting buttons SB1, SB2 are adapted for adjusting the longitudinal center line of the film 'F' to conform to the center line of the viewing screen 4 and respectively correspond to the relative shifting direction between the film 'F' and the screen 4. That is to say, while the first film shifting button SB1 is depressed, the film carrier 2 keeps moving downwardly of the screen 4, thereby a projected image on the screen 4 being moved downwardly therewith. On the other hand, the second film shifting button SB2 is employed for shifting the projected image upwardly of the screen 4.

More particularly, with the depression of the first film shifting button SB1, the first switch 35 is closed to switch the input port PI3 to 'L', whereby the microcomputer MC causes the output signal from the output port P40 to be 'H', turns 'ON' the first relay 33a and starts the motor 27. In this condition, the output signal from the output port P41 is in 'L' level and the motor 27 is driven in normal rotation. When the film shifting button SB1 is released from the depression, the motor 27 is stopped.

With a depression of the second film shifting button SB2, the input signal to the input port PI4 is switched to 'L', whereby the microcomputer MC causes the output signals from the output ports P40 and P41 to be 'H', turns 'ON' the two relays 33a and 33b, switches the second relay terminal 32b and drives the motor 27 in reverse rotation. When the second film shifting button SB2 is released from its depression, the motor 27 is stopped.

If the film carrier 2 is judged, based on the datum obtained from the rotary encoder 28, to be placed in one of its shifting limit positions, the microcomputer MC inhibits the film carrier 2 from being shifted beyond the limit.

Each of the terminals (a) through (c) of the rotary switch 34 operatively connected to the channel switching knob CK is related to a stop position of the film carrier 2 in the width direction of the film.

When the rotary switch 34 becomes connected to the first terminal (a) shown upwardly in the figure, the film carrier 2 is so shifted as to permit the micro image IA in the channel upward of the viewing screen 4, i.e. in the 'A' channel, to be projected centrally of the screen 4. In this condition, the micro images IA and IB are so relatively positioned in accordance with a magnifying ratio of the projecting lens 20 as shown in FIG. 6-d or 6-e. That is, the center line CA of the micro image IA in the 'A' channel along the longitudinal direction of the film 'F' agrees to a center line Cs of the viewing screen 4.

On the other hand, when the rotary switch 38 becomes connected to the second terminal (b) shown downwardly in the fugure, the film carrier 2 is so shifted as to permit the micro image IB in the channel downwardly of the screen 4, i.e. in the 'B' channel to be projected centrally of the viewing screen 4. In this condition, the micro images IA and IB are so relatively positioned in accordance with the magnifying ratio of the projecting lens 20 as shown in FIG. 6-f or 6-g. That is, the center line CB of the micro image IB in the 'B' channel along the longitudinal direction of the film agrees the center line Cs of the screen 4.

Further, when the rotary switch 34 becomes connected to the third terminal (c) shown centrally in the figure, the film carrier 2 is so shifted as to permit a center line C0 along the longitudinal direction of the film 'F' to agree to the center line Cs of the viewing screen 4 with any kind of the micro films being employed. (This position will be referred to as 'C' channel hereinafter.)

In this condition, the relative position between the micro images IA and IB on the screen 4 is illustrated in FIG. 6-a with the mono-type micro film 'F' employed, or in FIG. 6-b with the duo-type micro film 'F' employed.

The positioning operation during shifting the film carrier 2 by operating the aforementioned channel switching knob CK is executed as described hereinafter.

The microcomputer MC is adapted to be capable of computing the coordinate value in the coordinate system extending in the width direction of the film 'F' which represents the present position of the film carrier 2.

The coordinate value corresponding to the distance between the stop positions of the film carrier 2 in the channels which is pre-set by means of the number setting keys SS of the controller 3, is computed in advance and stored in a memory 'm'.

When the channel is switched by operating the channel switching knob CK, the present channel is judged by means of flags and the like. Then, the object coordinate value is computed by adding or subtracting the coordinate value corresponding to a distance between the switched channel and the present channel to or from the coordinate value corresponding to the present channel. The motor 27 is driven in the normal or reverse rotation depending on the relationship between the two channels until the detected coordinate value cumputed based on the input signal from the rotary encoder 28 agrees to the object coordinate value.

The drive control system of the motor 27 will be more particularly described hereinafter with reference to flow charts in FIGS. 10 and 11.

After initialization at step #23, the various parameters set by operating the number setting keys SS of the controller 3, the film shifting buttons SB1, SB2 or the channel switching knob CK are input at step #24. The shifting coordinate datum ER set by the number setting keys SS is stored in the memory 'm' in the microcomputer MC at step #25. When either of the film shifting buttons SB1, SB2 or the channel switching knob CK is operated at step #26, the channel switching routine is executed at step #27. When not, the process goes on to step #28. If the searching command is input at step #28, the motors 14, 15 are driven to carry out the searching operation at step #29. If not, the process returns to step #24 and the abovementioned process is repeated.

A film carrier shifting control routine serving as the channel switching routine at step #27 will be more particularly described next. At steps #101, #102, the position of the channel switching knob CK, i.e. the presently selected channel is judged based on the states of the input ports PI0 and PI2. Assuming that the channel switching knob CK is set in the 'C' channel position, the input port PI1 alone is in the state of 'L', thus the process goes on to step #103.

At steps #103 and #104, statuses of two channel setting flags CSFA, CSFB are checked. The statuses of these flags CSFA and CSFB vary in accordance with the position of the channel switching knob CK before the channel switching routine is called. More specifically, the A-channel setting flag CSFA is set to '1' when the film carrier 2 is in the 'A' channel position, while the B-channel setting flag CSFB is set to '1' when the film carrier 2 is in the 'B' channel position.

If it is judged at step #103 that the A-channel setting flag is set to '1', it means that the film carrier 2 is in the 'A' channel position and this routine is called by switching the channel from 'A' to 'C'. Therefore, in this case, the process goes on to the flow following step #111 to drive the motor 27 for the carrier shifting device 'V' to switch the channel from 'A' to 'C'.

If it is judged atstep #103 that the A-channel setting flag CSFA is not set to '1' and it is judged at step #104 that the B-channel setting flag CSFB is set to '1', it means that the film carrier 2 is in the 'B' channel and the channel switching routine is called by operating the channel switching knob CK from the 'B' channel to 'C' channel. In this case, the process goes on to the flow following step #121 to drive the motor 27 for the carrier shifting device 'V' to shift the film carrier 2 from the 'B' channel to the 'C' channel.

If it is judged at steps #103 and #104 that neither of the channel setting flags CSFA, CSFB is set, it means that the film carrier 2 is in the 'C' channel position, i.e. the channel switching routine is called not by operating the channel switching knob CK but by operating either of the film shifting buttons SB1, SB2. In this case, the process goes on to the flow following step #131 to keep shifting the film carrier 2 while the film shifting button SB1 or SB2 is depressed.

The flow after step #111 will be particularly described next. At step #111, the present position of the film carrier 2, as the detection coordinate datum EN relative to the coordinate axis extending in the width direction of the film 'F', is computed. Then, the shifting coordinate datum ER corresponding to the distance between the 'A' channel and the 'C' channel and an adjusting coordinate datum ES for adjusting the shifting amount are respectively loaded at step #112.

The adjusting coordinate datum ES, which will be more particularly descirbed later, corresponds to a displacement of the film carrier 2 from its standard position. That is, the adjusting coordinate datum ES is accumulated when the film carrier 2 is shifted by operating the film shifting buttons SB1, SB2. At step #113, the shifting object datum EG for shifting the film carrier 2 is computed based on the three coordinate data EN, ER, ES. Then, the output ports P40 and P41 are switched to 'H' to turn 'ON' the two relays 33a, 33b at step #114, whereby the motor 27 starts its reverse rotation to shift the film carrier 2 downwardly relative to the viewing screen 4. At step #115, the detection coordinate datum EN of the shifting film carrier 2 is computed based on the information obtained from the rotary encoder 28 and this datum EN is compared with the shifting object datum EG at step #116.

When the detection coordinate datum EN does not agree to the shifting object datum EG, the process returns to step #114 to keep shifting the film carrier 2. When the data EN and EG agree to each other, the output port P40 is switched to 'L' to turn 'OFF' the first relay 33a at step #117, whereby the motor 27 is stopped to stop shifting the film carrier 2. At this time, the film carrier 2 is positioned in the 'C' channel.

At step #118, a C-channel setting flag CSFC is set to '1', the A-channel setting flag CSFA is reset at step #119 and the process returns to the main routine.

The flow after step #121 will be described next. In the same way as the flow after step #111, the detection coordinate datum EN is computed at step #121. At step #122, the shifting coordinate datum ER and the adjusting coordinate datum ES are loaded at step #122. In this condition, the shifting coordinate datum ER corresponds to the distance between the 'B' channel and the 'C' channel and has substantially the same value as the shifting coordinate datum ER loaded at step #112 and corresponding to the distance between the 'A' channel and the 'C' channel.

A shifting object datum EG for shifting the film carrier 2 is computed from the three coordinate data EN, ER, ES at step #123. At step #124, the output port P40 is switched to 'H' and the output port P41 is switched to 'L' thereby turning 'ON' the first relay 33a alone to drive the motor 27 in normal rotation to shift the film carrier 2 upwardly relative to the viewing screen 4. At step #125, the detection coordinate datum EN of the shifting film carrier 2 is computed based on the information from the rotary encoder 28 and at step #126 this datum EN is compared with the shifting object datum EG.

When the detection coordinate datum EN does not agree to the shifting object datum EG, the process returns to step #124 to keep shifting the film carrier 2. When the detection coordinate datum EN agrees to the shifting object datum EG, the output port P40 is switched to 'L' to turn 'OFF' the first relay 33a at step #127, whereby the motor 27 is stopped to stop shifting the film carrier 2. At this time, the film carrier 2 is in the 'C' channel position.

At step #128, the C-channel setting flag CSFC is set to '1', the B-channel setting flag CSFB is reset at step #129 and the process returns to the main routine.

The flow after step #131 will be described next. This flow is executed, as described above, if either of the film shifting buttons SB1, SB2 is depressed with the 'C' channel selected. At step #131, it is judged based on the state of the input port PI3 which of the buttons SB1, SB2 is depressed. If the input port PI3 is in the state of 'L', it means that the first film shifting button SB1 is depressed and the first switch 35 is closed. In this case, the process goes on to the flow after step #132 to drive the motor 27 to shift the film carrier 2 downwardly of the viewing screen 4.

In the flow after step #132, in order to compute a displacement from the standard position of the 'C' channel, the present detection coordinate datum EN, which is the coordinate datum representing the standard position of the 'C' channel, is computed at step #132. This datum EN is temporarily stored at step #133. At step #134, the output port P40 is switched to 'H' and the output port P41 is switched to 'L', whereby the motor 27 starts its normal rotation to shift the film carrier 2 downwardly relative to the viewing screen 4.

At step #135, the state of the first film shifting button SB1 is judged based on the state of the input port PI3. While the input port PI3 is maintained in the 'L' level, i.e. the first film shifting button SB1 is depressed, the process returns to step #134 to keep driving the motor 27 in normal rotation. When the input port PI3 is switched to 'H', i.e. the first film shifting button SB1 is released from the depression, the output port P40 is switched to 'L' to turn 'OFF' the first relay 33a at step #136, whereby the motor 27 is stopped to stop shifting the film carrier 2.

At step #137, the present detection coordinate datum EN is computed and from this datum EN, at step #138, is subtracted the coordinate datum EC stored at step #133 and representing the standard position. The resulting datum becomes the adjusting coordinate datum ES used for computing the shifting object datum EG during a channel switching operation. At step #139, the C-channel setting flag CSFC is set to '1' and the process returns to the main routine.

On the other hand, if the input port PI3 is judged to be in 'H' level at step #131, it means that the second film shifting button SB2 is depressed and the second switch 36 is closed. In this case, the process goes on to the flow after step #141 to drive the motor 27 to shift the film carrier 2 upwardly relative to the viewing screen 4.

In the flow after step #141, as in the same manner as step #132, the present detection coordinate datum EN is computed at step #141 and this datum EN is stored at step #142. At step #143, the output ports P40 and P41 are switched to 'H' to turn 'ON' the first and second relays 33a, 33b, whereby the motor 27 starts its normal rotation to shift the film carrier 2 upwardly relative to the viewing screen 4.

At step #144, the state of the second film shifting button SB2 is judged based on the state of the input port PI4. While the input port PI4 is maintained in the 'L' level, i.e. the second film shifting button SB2 is depressed, the process returns to step #143 to keep driving the motor 27 in normal rotation. When the input port PI4 is switched to 'H', i.e. the second film shifting button SB2 is released from the depression, the output port P40 is switched to 'L' to turn 'OFF' the first relay 33a at step #145, whereby the motor 27 is stopped to stop shifting the film carrier 2.

At step #146, the present ditection coordinate datum EN is computed and by subtracting the coordinate datum EC, which is stored at step #142 and represents the standard position, from the datum EN, the adjusting coordinate datum ES is computed at step #147. At step #148, the C-channel setting flag CSFC is set to '1' and and the process returns to the main routine.

If the channel switching knob CK is in the 'A' channel position, based on the judgement made at step #1 a subroutine for switching to 'A' channel is called at step #200. If the channel switching knob CK is in the 'B' channel position, based on the judgement made at step #102 a subroutine for switching to the 'B' channel is called at step #300.

This subroutine for switching to 'A' channel will be briefly described with reference to FIG. 12. At step #201, based on whether the C-channel setting flag CFSC is set to '1' or not, it is judged whether the switching is to be made from the 'C' channel to the 'A' channel or from the 'B' channel to the 'A' channel. In the case of switching from the 'C' channel, steps #202 through #210 are carried out and in the case of switching from the 'B' channel, steps #211 through #219 are carried out.

This subroutine, in the case of switching from the 'B' channel to the 'A' channel, is substantially the same as the flow after step #103 illustrated in FIG. 11A except that the shifting coordinate datum ER has a value twice as large as the distance between the 'C' channel and the 'A' channel or the distance between the 'C' channel and the 'B' channel, therefore will not be particulary described here.

Also, the subroutine for switching to 'B' channel is substantially the same as the above-described flow, thus will not be described nor illustrated in figures.

In the aforementioned embodiment, the driving amount of the motor 27 during the channel switching operations is variablly set by operating the number setting keys SS of the controller 3. In place of this arrangement, the driving amount of the motor 27 may be variablly set by changing the standard voltage with a knob or a lever being operatively connected to a variable registor. These knob, level and variable registor will be generically referred to as shifting amount setting means SS . Also, as for the channel switching means CK, the knob employed in the preceding embodiment may be replaced by a button or a lever.

In the preceding embodiment, in shifting the film carrier 2 in the width direction of the micro film 'F' with the duo-type micro film used, the shifting is so controlled that the center line, longitudinal of the film, referred to as CA or CB in FIG. 4-b, of the micro image IA or IB of either of the channels conforms with the up and down center line of the viewing screen 4. In place of this, the shifting may be controlled in such a way that an upper edge or a lower edge of the micro image IA or IB of either of the channels conforms with an upper endge or a lower edge of the viewing screen 4. Namely, in embodying the present invention, the driving apparatus such as the motor 27 for the carrier shifting device 'V' may be controlled in any way as long as the micro image IA or IB in a channel different from the present channel is entirely, relative to the width direction of the film 'F', projected on the viewing screen 4.

The micro film reader-printer in the aforementioned embodiment is adapted to be switchable among the three channels so that either of the monotype or the duo-type micro film may be used. In place of this, the micro film reader-printer may be adapted to be switchable between two channels to handle only the duo-type micro film 'F'.

Moreover, the scope of the present invention is not limited to the micro film reader-printer described in the preferred embodiments but may be applicable to a micro film reader having no function for printing the micro images 'I', IA, IB.

We claim:

1. A micro film reader for projecting by optical means on a projection surface a selected image recorded in a micro film having a plurality of recording channels in a direction of width of said micro film, comprising;
   (a) a film carrier for holding and transporting said micro film,
   (b) carrier support means for supporting said film carrier and capable of shifting said film carrier in the width direction of said micro film,
   (c) drive means for shifting said film carrier in the width direction of said micro film,
   (d) shifting amount setting means for setting shifting amount of said film carrier,
   (e) means for controlling said drive means, including channel switching means for controlling said drive means to shift said film carrier in response to shifting amount set by said shifting amount setting means.

2. A micro film reader as defined in claim 1, wherein said control means further includes film shifting means which shifts said film carrier for fine adjustment in addition to shifting by said channel switching means.

3. A micro film reader as defined in claim 1 further comprising detection means for said shifting amount of said film carrier, and said control means controlling said drive means based on a comparison between actual shifting amount detected by and sent from said detection means and the shifting amount set by said shifting amount setting means.

4. A micro film reader as defined in claim 1, wherein said shifting amount setting means includes number setting keys as input means for inputting the shifting amount.

5. A micro film reader as defined in claim 1, wherein the shifting amount of said film carrier is set by utilizing as a reference point a position where a center of the width of said micro film conforms to a center of beam for projection.

6. A micro film reader as defined in claim 1, wherein said film carrier is rotatable about the center of said beam for projection.

7. A micro film reader for projecting by optical means on a projection surface a selected image recorded in a micro film having a plurality of recording channels in a direction of width of said micro film, comprising:
   (a) a film carrier for holding and transporting said micro film;
   (b) carrier support means for supporting said film carrier and capable of shifting said film carrier in the width direction of said micro film,
   (c) drive means for shifting said film carrier in the width direction of said micro film,
   (d) first channel detecting means for detecting a present channel projected on said projection surface,
   (e) second channel detecting means for detecting a channel including a designated micro image,
   (f) channel switching means for controlling said drive means and for switching channels to be projected, said channel switching means operating when said present channel is different from the channel including the designated micro image.

8. A micro film reader as defined in claim 7, further comprising shifting amount setting means for setting shifting amount of said film carrier, wherein said channel switching means controls the drive means to shift said film carrier in response to shifting amount set by said shifting amount setting means.

9. A micro film reader as defined in claim 8, further comprising detecting means for the shifting amount of said film carrier, and said control means controlling said drive means based on a comparison between actual shifting amount detected by and sent from said detection means and the shifting amount set by said shifting amount setting means.

10. A micro film reader as defined in claim 7, wherein said second channel detecting means comprises means for detecting the designated micro image.

* * * * *